United States Patent [19]
Belart

[11] Patent Number: 4,643,490
[45] Date of Patent: Feb. 17, 1987

[54] HYDRAULIC SERVO VEHICLE BRAKE

[75] Inventor: Juan Belart, Walldorf, Fed. Rep. of Germany

[73] Assignee: Alfred Teves GmbH, Frankfurt am Main, Fed. Rep. of Germany

[21] Appl. No.: 747,120

[22] Filed: Jun. 20, 1985

[30] Foreign Application Priority Data

Jun. 22, 1984 [DE] Fed. Rep. of Germany ....... 3423029

[51] Int. Cl.$^4$ .................................................. B60T 8/02
[52] U.S. Cl. ................................ 303/115; 188/181 A; 303/119
[58] Field of Search ............... 303/113, 114, 115, 116, 303/119; 188/181 A; 65/548, 564

[56] References Cited

U.S. PATENT DOCUMENTS

| | | | |
|---|---|---|---|
| 4,036,534 | 7/1977 | Kondo et al. | 303/114 |
| 4,354,714 | 10/1982 | Belart | 303/119 X |
| 4,416,491 | 11/1983 | Belart et al. | 303/113 |
| 4,482,190 | 11/1984 | Burgdorf et al. | 303/114 X |

Primary Examiner—Duane A. Reger
Assistant Examiner—M. C. Graham
Attorney, Agent, or Firm—James B. Raden; William J. Michals

[57] ABSTRACT

A hydraulic servo vehicle brake is provided with a pedal-actuated master cylinder (11) and a first brake circuit I is connected to the pressure chamber (76) subjected to the pressure exerted by the master piston (24). Between the brake pedal (16) and the master piston (24), a brake application valve (17) is arranged which, on actuation by the brake pedal (16), applies pressure medium supplied by a hydraulic pump (18) connected with a fluid reservoir (27) in a controlled manner to the master piston. A wheel slip-brake control unit is provided which, in the event of incipient slip of a vehicle wheel, automatically reduces the brake power at the relevant vehicle wheel to a value just enabling the wheel to rotate and which comprises a switching valve (21) which is also subjected to the controlled pressure and is normally closed and opens at incipient slip of the associated vehicle wheel in order to apply the controlled pressure to the pressure chamber on which the master piston acts. The outlet (136) of the switching valve (21) is linked to the pressure chamber (76) subjected to the pressure exerted by the master piston (24) through a non-return valve (23) which opens when the pressure supplied form the outlet (136) of the switching valve (21) is higher than the pressure in the pressure chamber (76) and which is closed in any other condition. The master piston (24) succeeding the brake application valve (17) as well as the master cylinder (11) are provided with a stepped extension (24' and 11', respectively) in the direction of the pressure chamber (76) subjected to the pressure applied by the master piston (24). The pedal-retaining annular chamber (25) is normally connected with the fluid reservoir (27) through a pedal-retaining valve (26) controlled by the switching valve (21) and is sealed off from the atmosphere in the event of a wheel slip.

7 Claims, 5 Drawing Figures 4,643,490

HYDRAULIC SERVO VEHICLE BRAKE

BACKGROUND OF THE INVENTION

This invention relates to a hydraulic servo vehicle brake with a master cylinder which contains at least one pedal-actuated master piston and at least one first brake circuit with wheel cylinders linked to the pressure chamber subjected to the pressure exerted by the master piston. A brake application valve is arranged between the brake pedal and the master piston and, on actuation by the brake pedal, applies pressure medium supplied by a hydraulic pump connected with a fluid reservoir in a controlled manner to the master piston and directly to a further brake circuit and furnishing a controlled pressure. A wheel slip-brake control unit which, in the event of incipient slip of one single or several vehicle wheels, automatically reduces the brake power at the relevant vehicle wheel or relevant vehicle wheels to a value just enabling the wheels to rotate. The control unit comprises a switching valve which is also subjected to the controlled pressure and is normally closed and opens at incipient slip of one or several vehicle wheels in order to apply the controlled pressure, through a non-return valve, directly to the pressure chamber on which the master piston acts. A hydraulic pedal-retaining arrangement which is subjected to the controlled pressure which penetrates through the opening switching valve, prevents any major change of the position the pedal has assumed at the moment of opening of the switching valve.

As soon as a wheel slip occurs in such a vehicle brake, the closing and opening valves, respectively provided at the wheel cylinders involved start to work cyclically in order to limit the brake pressure in the wheel cylinders to a value at which locking of the wheel is just avoided. Due to the cyclic functioning of the valves, a certain amount of pressure medium is consumed which requires balancing from the master cylinder in order to safeguard normal operation of the wheel cylinders.

It is known from German patent application No. 3,040,561 to convey the controlled pressure directly to the brake circuits past the sealing cup of one or both master pistons which is arranged as a valve in that the switching valve is commutated by the wheel slip-brake control unit in such a manner that the chambers before the sealing cup are linked to the controlled pressure instead of the fluid reservoir. In this known arrangement, the counterforce at the pedal is missing, so that the brake actuating pedal drops down and forward without providing any braking action and this will not only alarm the driver but also has the disadvantage that in the event of a failure of the auxiliary energy, a mechanical emergency operation of the brake would no longer be assured. For this reason, in the known vehicle brake, a positioning piston is provided which is also subjected to the controlled pressure through the switching valve and which moves in opposite direction to the master pistons when the switching valve is commutated. By means of stops the positioning piston prevents the primary or first master piston from sliding in the forward direction beyond a determined point as long as the auxiliary energy is available. In this manner, the brake pedal will not fully drop down when the switching valve responds, so that a sufficient pedal travel for an emergency stop will still be available in the event of a failure of the auxiliary energy.

It is, however, a disadvantage of the known vehicle brake that the positioning piston is required which has to be movable relative to the master piston and be sealed off by seals with respect both to the master piston and to the master cylinder. In addition, an increased overall space is required due to the arrangement and necessary play or motion of the positioning piston.

It is therefore an object of the present invention to create a vehicle brake of the type described by means of which drop down of the brake pedal when the switching valve responds is avoided without a positioning piston being required for that purpose.

SUMMARY OF THE INVENTION

This object is achieved according to the invention wherein the outlet of the switching valve is linked to the pressure chamber subjected to the pressure exerted by the master piston through a change-over valve and a non-return valve which opens when the pressure supplied from the outlet of the switching valve is higher than the pressure in the pressure chamber and which is closed in any other condition. The master piston succeeding the brake application valve as well as the master cylinder are furnished with a stepped extension in the direction of the pressure chamber subjected to the pressure applied by the master piston. The pedal-retaining annular chamber so formed is normally connected with the fluid reservoir through a pedal-retaining valve controlled by the switching valve and is sealed off from the atmosphere in the event of a wheel slip.

The change-over valve links the non-return valve either to the controlled pressure, that is when the switching valve is open, or to the fluid reservoir instead, in all other conditions.

It is a basic feature of the present invention that, on opening of the switching valve, the controlled pressure is brought to bear on the master piston in contrast to the direction of pedal actuation, so that in lieu of a force letting the pedal drop down, a hydraulic power originates at the master piston which restores the pedal when the switching valve is open. Then, in order to avoid a sudden return movement of the master piston in this case, and thus of the brake pedal, the pedal-retaining annular chamber provided at the stepped extension is separated from the fluid reservoir and is entirely sealed off with respect to the atmosphere at the moment of opening of the switching valve. As a result, the pedal is retained in the position it has assumed at the moment of commutation of the switching valve. If the auxiliary energy should now fail to be available due to a fault, the non-return valve would close immediately because of the missing of the controlled pressure and would open the pedal-retaining valve, and the master piston could still supply the connected brake circuit with sufficient pressure medium by way of direct actuation through the pedal.

In accordance with the present invention, the master cylinder allows a very compact design, without additional moving components. The additionally required pedal-retaining valve may be arranged in a comparatively compact shape and be positioned in a suitable point outside the master cylinder.

In an advantageous embodiment of the pedal-retaining valve, the pedal-retaining valve is furnished with a piston slide element. The slide element is subjected to the pressure conveyed by the switching valve and accommodated in a cylinder into whose cylinder chamber facing away from the pressure side hydraulic lines leading to the fluid reservoir and to the pedal-retaining annular chamber, respectively end up through connections which normally are interconnected through the cylinder chamber, but which are separated hydraulically when the piston slide element is shifted because the switching valve has opened.

According to a first alternative embodiment the piston slide element is arranged in the shape of a valve slide element and shuts off one of the connections when it slides. It is also possible that a closing member arranged at the piston slide element on the side of the cylinder chamber may close the connection positioned opposite the piston slide element on a slide of the latter.

In a particularly simple embodiment a master piston with the stepped extension is provided in the master cylinder, which master piston is subjected to the action of the pedal and to the auxiliary energy generated by the controlled pressure and which acts upon one single pressure chamber to which the non-return valve is linked beyond the first brake circuit.

If a relatively elevated pedal retaining force is desired to be available in the event of a wheel slip, then another embodiment is particularly suited which is arranged so that the master piston is provided, on the side facing its pressure chamber, with a cylinder axial bore into which stationary second master piston originating from the master cylinder bottom tightly extends. The non-return valve is arranged in the shape of a sealing cup and provided between the second master piston and the annular portion of the piston. The annular portion is defined by the axial bore which preferably also includes the stepped extension. The switching valve is linked to the annular chamber existing around that portion of the second master piston which projects from the axial bore of the master piston. The linkage is realized by way of a change-over valve which normally links the annular chamber with the fluid reservoir, but which connects the annular chamber with the switching valve instead in the event of a wheel slip.

In an application for a tandem master cylinder, according to the invention, the master piston is furnished on the side facing its pressure chamber with a cylindrical axial bore into which a fitting second master piston originating from the master cylinder bottom tightly extends which is axially slidable within a portion of the master cylinder. The non-return valve in the shape of a sealing cup is provided between the second master piston and the annular portion of the piston. The annular portion is defined by the axial bore which preferably also includes the stepped extension, and the switching valve is linked to the annular chamber existing around that portion of the second master piston which projects from the axial bore of the master piston. The linkage is realized by way of a change-over valve which normally links the annular chamber with the fluid reservoir, but which connects the annular chamber with the switching valve instead in the event of a wheel slip. The change-over valve is also linked, through a further non-return valve, to the pressure chamber which is subjected to the pressure applied by the second master piston and from which a second brake circuit is branched off. It is of importance in the two embodiments that the annular portion of the first master piston is radially externally furnished with an annular chamber to which the first brake circuit is linked and which is connected, through bores, with the pressure chamber.

In an advantageous embodiment the change-over valve is provided with a piston which is furnished with an opening and is subjected to the force of a return spring contrasting the pressure applied to that piston and in which a closing push rod with a closing plate is arranged. The push rod is opposed by an outlet port and closes that outlet port when abutting against it. The closing push rod interacts with its other end with a valve closing the opening in the piston. The interaction is such that upon the closure of the outlet port, the closing push rod opens the valve when the piston mover further, with the inlet port being linked to the switching valve, the outlet port to the fluid reservoir and the chamber between the piston and the outlet port, through a connecting port and to the annular chamber.

It is also possible to design the non-return valve as a sealing cup, as is particularly expedient in case of providing a second or secondary master piston, even if the non-return valve is immovably arranged at the bottom of the master cylinder. In this case, in a preferred solution according to the present invention, the non-return valve is arranged in a cylindrical supporting element which is arranged at the bottom of the master cylinder and which bears an apertured ring on the side linked to the switching valve and the non-return valve arranged as a sealing cup on the opposite side.

In order to ensure a regular return of the master piston, a return spring extends between each master piston and the bottom of the master cylinder. In order to ensure a regular initial position of the master pistons, another embodiment provides that between each master piston and the bottom of the master cylinder a stop device extends which limits the return movement of the relevant master piston.

BRIEF DESCRIPTION OF THE DRAWING

The invention is described below with reference to the drawing in which.

DETAILED DESCRIPTION

Figure 1:
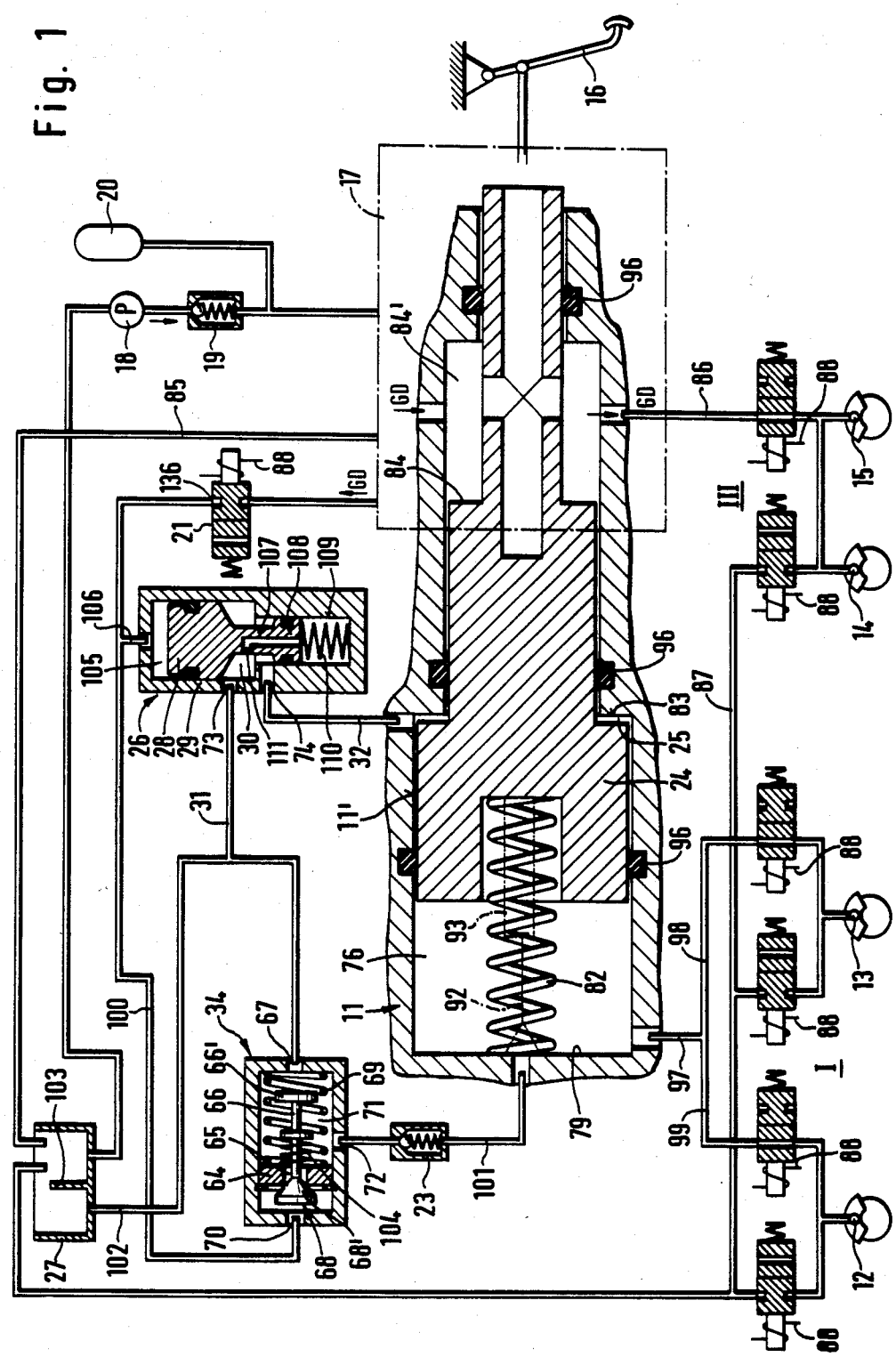
FIG. 1 is a schematic representation, partly in cross-section and partly in the shape of a circuit block diagram, of a hydraulic servo vehicle brake according to the invention, with a simplex master cylinder.

In all Figures, like reference numerals and letters designate like elements. According to FIG. 1, in a master cylinder 11 provided with an outwardly projecting annular step 83, a master piston 24 of a corresponding outwardly projecting stepped configuration is axially slidably accommodated. The master piston 24 is, therefore, formed with a stepped extension 24' and the master cylinder 11 with a stepped extension 11'.

Between the brake pedal 16 outlined in dashed lines and the master piston 24, a brake application valve 17 outlined only by a dash-dotted frame is provided which, through a non-return valve 19, is subjected to the pressure supplied by a pump 18 and by an accumulator 20, respectively, which is arranged in parallel. On operation of the brake pedal 16, the brake application valve 17 applies a controlled pressure GD in a controlled manner to the front face 84 of the master piston 24 and to a switching valve 21 which normally is in the closed position shown in FIG. 1.

Seals 96 take care of the necessary sealing between the individual pressure chambers 25, 76, 84' to be separated from one another.

The brake application valve 17 is, in addition, linked, through a hydraulic line 85, to the fluid reservoir 27 in order to recycle to the fluid reservoir 27 the pressure medium displaced during release of the brake.

The design of the brake application valve 17 and of the brake power booster linked to it may be as described in the German patent applications published without examination Nos. 3,040,561 and 3,317,636.

The controlled pressure GD brought to bear on the front face 84 of the master piston 24 is conveyed, through a further hydraulic line 86, also a brake circuit III by way of a normally open closing valve SO (meaning a valve, open when de-energized) of the two rear-axle wheel cylinders 14, 15 which are connected in parallel. From the rear-axle wheel cylinders 14, 15, a further hydraulic line 87 leads, by way of a normally closed opening valve SG (meaning a valve, closed when de-energized), back to the fluid reservoir 27.

The closing valve SO and the opening valve SG are controlled by a wheel slip-brake control unit not shown in the drawing, and this is outlined by control lines 88 illustrated in dashed lines. In the event of a slippage at the rear wheels detected by a sensor, first the closing valve SO closes in order to limit the pressure in the wheel cylinders 14, 15. If this not yet sufficient to avoid a wheel slip, the opening valve SG will open in addition. Generally, a cyclic opening and closing of the valves SO and SG will take place at the moment of an incipient wheel slip, as a result whereof a determined volume of pressure medium is consumed which must be made up for by the pump 18.

In the pressure chamber 76 subjected to the pressure applied by the master piston 24, a return spring 82 is arranged which extends between the bottom 79 and the master piston 24 and which, upon a braking action, takes care that the master piston 24 is restored into its initial position. Between the bottom 79 of the master cylinder 11 and the master piston 24, furthermore, a stop device 92, 93 extends, outlined only in dashed lines in the drawing, which defines the initial position of the master piston 24 analogously to the embodiment according to FIG. 2 which will be described further on.

A hydraulic line 97 branches off from the pressure chamber 76 to a brake circuit I acting upon the front-axle wheel cylinders 12, 13. The hydraulic line 97 leads, through branched hydraulic lines 98, 99, to the two closing valves SO of the wheel cylinders 12 and 13, respectively.

The method of functioning of the closing and opening valves SO and SG, respectively at the front wheel cylinders 12, 13 is analogous to the method of functioning described above of the valves with identical reference letters at the wheel cylinders 14, 15 of the rear axle.

Also the switching valve 21 is connected, through a control line 88', with the wheel slip-brake control unit not shown in the drawing, precisely in such a manner that it is commutated into the open position as soon as a wheel slippage is detected at one of the two front wheels interacting with the wheel cylinders 12, 13.

In this way, the controlled pressure GD is applied, through the switching valve 21, a hydraulic line 100, a change-over valve 34 and a hydraulic line 101, to a non-return valve 23 which is in linkage with the pressure chamber 76 of the master cylinder 11 through a line 101. The non-return valve 23 opens as soon as the pressure in the hydraulic line 100 exceeds the pressure in the pressure chamber 76, as a result whereof pressure medium may then flow, through the switching valve 21 and the non-return valve 23, into the pressure chamber 76 and from there forth to the wheel cylinders 12, 13 in the brake circuit I, as far as this is necessary in case of excessive pressure medium consumption in the event of a wheel slippage.

The change-over valve 34 contains an axially slidable piston 64 with a central opening 65 through which a closing push rod 66 extends which at its end facing away from the opening 65, bears a closing plate 66' to close an outlet port 67 in a fluid-tight manner when it comes to rest on the outlet port 67.

The outlet port 67 is linked, through a hydraulic line 102, with the fluid reservoir which is subdivided into two compartments for safety reasons between which a slightly lower wall 103 is arranged.

At the end of the closing push rod 66 facing away from the outlet port 67, there is arranged a valve 68 which is constituted by a valve cone 68' and the edge of the opening 65 in FIG. 1. A spring 69 preloads the piston 64 in the direction of the pressure inlet port 70, whereas another spring 104 forces the valve cone 68' against the edge of the opening 65 in the piston 64.

The spring 69 is dimensioned such that upon commutation of the switching valve 21, the controlled pressure GD slides the piston 64 in forward direction to the right as viewed in FIG. 1 until the closing plate 66' closes the outlet port 67. The piston then moves further to the right compressing the spring 104, as a result whereof the valve 68 opens and a free path of flow is established in axial direction between the edge of the opening 65 and the closing push rod 66 through which the hydraulic line 100 and the hydraulic line 101 branching off from the chamber 71 between the piston 64 and the outlet port 67 are linked to each other. The controlled pressure now comes to be applied to the non-return valve 23.

That means that the change-over valve 34 serves the purpose to link the non-return valve 23 to the fluid reservoir 27 in normal operation of the brake without incipient wheel slip, so that pressure medium allows to be reaspirated through the non-return valve 23, but to interrupt that link and to connect the non-return valve 23 with the switching valve 21 instead when the switching valve 21 has changed over the change-over valve 34 into its other switching position on account of an incipient wheel slip.

Since due to the pressure build-up in the pressure chamber 76 upon the commutation of the switching valve 21 and upon the opening of the non-return valve 23 a restoring force is exerted on the master piston 24 which is higher than the force in the direction of forward slide brought to bear on it through the front face 84, the pedal-retaining annular chamber 25 is provided at the annular step 83 of the master cylinder 11, which pedal-retaining annular chamber 25 is linked, through a hydraulic line 32, to a pedal-retaining valve 26. The pedal-retaining valve 26 contains a piston slide element 28 sliding within a cylinder 29, the pressure side 105 of which piston slide element 28 is linked, through a hydraulic line 106, to the hydraulic line 100 which is subjected to the controlled pressure GD when the switching valve 21 is open. At its end facing away from the pressure chamber 105, the piston slide element 28 is formed with a reduced-diameter intermediate section 107 which is succeeded by a sliding piston 108 having a diameter sized between that of the intermediate section 107 and that of the piston slide element 28 and being adapted to slide within a cylinder section 109 having a correspondingly reduced diameter. A return spring 110 preloads the piston slide element 28 in the direction in contrast to the pressure applied to it in order to make sure that without pressure being applied to it, the piston slide element 28 always assumes the position shown in FIG. 1.

Around the intermediate section 107, an annular cylinder chamber 30 is configured at which two connections 73, 74 are provided in an axially offset position. Between the annular cylinder chamber 30 and the chamber accommodating the spring 110, there is arranged a pressure balancing line 111 which is provided in the intermediate section 107 and in the sliding piston 108.

The hydraulic line 32 is linked to the connection 74, whereas from the connection 73, a further hydraulic line 31 is in connection of flow with a hydraulic line 102 leading to the fluid reservoir 27.

The method of operation of the described hydraulic servo vehicle brake is as follows:

When the brake pedal 16 is operated, the controlled pressure GD will be applied directly to the rear-axle brake circuit III with the wheel cylinders 14, 15, while the front-axle wheel cylinders 12, 13 will be subjected to the pressure exerted by the master piston 24 when it slides in forward direction. The forward slide of the master piston 24 takes place by the action of the superimposed forces of the pedal 16 and of the controlled pressure GD on the front face 84.

In the event of an incipient wheel slip at one of the rear wheels during a braking action, the opening and closing valves SO and SG, respectively will be caused, through the control lines 88, to close and open, respectively in a cyclic manner contrasting the wheel slip. The pressure medium consumed by this procedure will be made up directly by the pump 18 and the accumulator 20, respectively through the hydraulic line 86, so that no problems will exist in this instance.

If, however, a slippage occurs at one of the front wheels, then the wheel slip-brake control unit will switch not only the closing and opening valves SO and SG, respectively provided at the wheel cylinders 12, 13 but also the switching valve 21 through the control line 88'.

In this way, the controlled pressure GD will be applied to the non-return valve 23 through the hydraulic line 100, the change-over valve 34 and the hydraulic line 101. Since the active area of the master piston 24 facing the pressure chamber 76 is larger than the front face 84, the pressure in the pressure chamber 76 will be lower than the controlled pressure GD applied to the front face 84. The full controlled pressure GD being applied, on the other hand, to the non-return valve 23 through the switching valve 21 by way of the hydraulic line 101, the non-return valve 23 will open, and the controlled pressure GD will not be conveyed directly to the brake circuit I through the pressure chamber 76.

The pressure medium consumed will now be made up directly and immediately by the pump 18.

Furthermore, also the piston slide element 28 is subjected to the controlled pressure GD from its pressure side 105 through the hydraulic line 106, so that it will be shifted into the lower position as viewed in FIG. 1, with the spring 110 being compressed, in which position it will shut off the connection 73, as a result whereof the pedal-retaining annular chamber 25 will also be separated from the fluid reservoir 27. In this manner, the piston 24 is prevented from being moved back when the non-return valve 23 opens.

Pressure medium will, thus, be supplied at sufficient quantity to the front-axle brake circuit I from the pump 18 directly through the non-return valve 23 and the pressure chamber 76, while the brake pedal 16 will remain in the position it has assumed at the moment of commutation of the switching valve 21.

If now the auxiliary energy should fail, for example due to a fault of the pump or a leakage in the supply lines, the non-return valve 23 would close again at once because of the missing input pressure and the pedal-retaining valve 26 would open, and the necessary pressure in the pressure chamber 76 could be built up by a further depression of the pedal 16 because, evidently, on account of the supply of pressure medium from the side facing the pressure chamber 76 of the master piston 24, the further forward slide of the master piston 24 was stopped at the moment of opening of the non-return valve 23. Since the change-over valve 34 will, in addition, now have established again the link from the non-return valve 23 to the fluid reservoir 27, pressure medium can also be reaspirated as far as necessary.

On the end of a wheel slippage in all normal cases, the switching valve 21 will close again whereupon also the non-return valve 23 will be closed and the vehicle brake will go on operating in the normal way, that is to say, supplying the rear-axle brake circuit III directly with the controlled pressure and the front-axle brake circuit I with the pressure generated by the master piston 24 in the pressure chamber 76.

Figure 2:
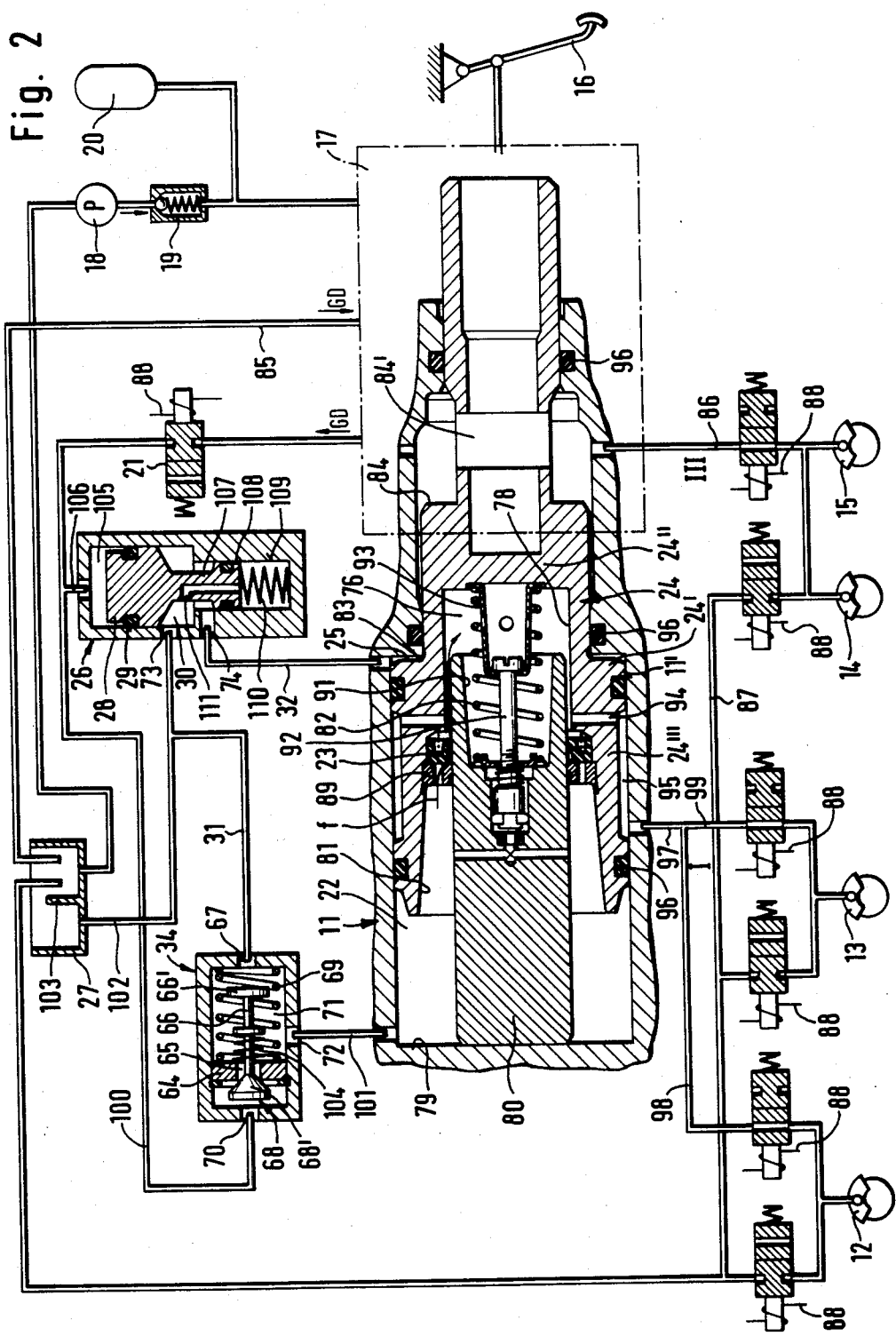
FIG. 2 is an identical-type view of another version of the servo vehicle brake according to FIG. 1, again with a simplex master cylinder, but already predisposed for the configuration in the shape of a tandem master cylinder.

In the embodiment according to FIG. 2, the master piston 24 is provided, on the side facing away from the pedal 16, with a cylindrical axial bore 78 which is separated from the front face 84 by the piston bottom 24". In this manner, the master piston 24 is furnished with an annular portion 24"' into which a second master piston 80 extends from the master cylinder bottom 79, which second master piston 80 is, however, coupled unslidably to the master cylinder bottom 79. A sealing cup serving as a non-return valve 23 is arranged at the inside wall of the annular portion 24"' and is sealingly abutted against the outside wall of the second master piston 80 and axially bounded at its rear by an apertured ring 89. From the apertured ring 89, the annular portion 24"' extends an additional length in the direction of the master cylinder bottom 79, a recess 81 being, however, provided radially internally through which the pertured ring 89 is linked to the annular chamber 22 surrounding the second master piston 80, which annular chamber 22 is connected, in its turn, to the change-over valve 34 through the hydraulic line 101.

Since the annular cup is simultaneously configured as a non-return valve 23, it opens up a path of flow when the pressure in the annular chamber 22 is higher than the pressure in the pressure chamber 76. Upstream of the non-return valve 23 formed by the sealing cup, an annular gap 90 is located between the second master piston 80 and the annular portion 24''' in order to render it possible to establish a continuous link for the pressure medium between the annular chamber 22 and the pressure chamber 76.

The second master piston 80 is furnished, at its front end, with an axial recess 91 in which a return spring 82 is arranged that extends up to the bottom 24'' of the master piston 24. The recess 91 accommodates, in addition, an axial stop bolt 92 which is fastened to the second master piston 80 at one end and, with its head provided at the other end, makes catch behind a stop bushing 93 being fixed to the bottom 24'' of the master piston 24. The return motion of the master piston 24 caused by the return spring 82 is limited in this manner.

Radial bores 94 branch off from the annular gap 90 which radially externally end up in a radially narrow annular chamber 95 formed between the master piston 24 and the master cylinder 11 and extending axially between two seals 94. From the annular chamber 95, the hydraulic line 97 to the front-axle brake circuit I branches off, which hydraulic line 97 is in flow connection with two further hydraulic lines 98, 99 leading to the closing valves SO of the two wheel cylinders 12, 13 of the front wheels. In addition, the front wheel cylinders 12, 13 are, on their part, linked, through opening valves SG, to the hydraulic line 87 leading to the fluid reservoir 27.

In the event of an incipient wheel slip at one of the front wheel, the mode of operation is analogous to that of the embodiment as per FIG. 1, that is to say, if pressure medium is now consumed at the wheel cylinders 12, 13, then the pump 18 and the accumulator 20, respectively will supply the necessary quantity of make-up pressure medium to the piston pressure chamber 76 and, thus, to the wheel cylinders 12, 13 through the change-over valve 34 and the annular chamber 22 along the line f in FIG. 2.

In this instance, the change-over valve 34 serves the additional function to avoid an undesirable pressure build-up in the annular chamber 22 during the forward slide of the master piston 24 by linking the annular chamber 22 normally to the fluid reservoir 27. In other words, the change-over valve 34 takes care that the pressure medium contained in the annular chamber 22 is normally flashed into the fluid reservoir 27 without pressure build-up and can freely flow back from the reservoir 27 when the brake is operated. The annular chamber 22 receives its essential function only upon commutation of the switching valve 21 in case of incipient wheel slippage.

Summarizing, the method of operation of the embodiment according to FIG. 2 is as follows:

If and when a slippage occurs at one of the front wheels, the wheel slip-brake control unit switches not only the closing and opening valves SO and SG, respectively, provided at the wheel cylinders 12, 13 but also the switching valve 21 by way of the control line 88', whereby the following switching actions are initiated:

1. The change-over valve 34 locks the link initially existing between the annular chamber 22 through the hydraulic line 101, the chamber 71, the hydraulic line 102, and the fluid reservoir 27 by the closing plate 66' going to rest on the outlet port 67.
2. By a further forward slide of the piston 64, the valve 68 opens and applies the controlled pressure to the annular chamber 22.
3. Through the hydraulic line 106 and the pressure chamber 105, the controlled pressure GD makes the piston slide element 28 slide into the lower limit position as viewed in FIG. 1, in which position the piston slide element 28 locks the connection 73, so that the link between the pedal-retaining annular chamber 25 and the fluid reservoir 27 is interrupted and a return motion of the master piston 24 is rendered impossible notwithstanding the increased pressure existing within the annular chamber 22.

As long as the switching valve 21 is open, make-up pressure medium will be supplied in the necessary manner from the pump 18 and the accumulator 20, respectively, through the hydraulic line 100, the change-over valve 34, the hydraulic line 101 and the annular chamber 22 along the path f, to the front wheel cylinders 12, 13.

As soon as the wheel slip has ended, the switching valve 21 will close again, and the valves 26, 34 will also return into their initial position under the action of the return springs 110, 69, 104 provided therein.

The annular chamber 22 is now linked again to the fluid reservoir 27, and the brake will continue to operate in the normal way.

Figure 3:
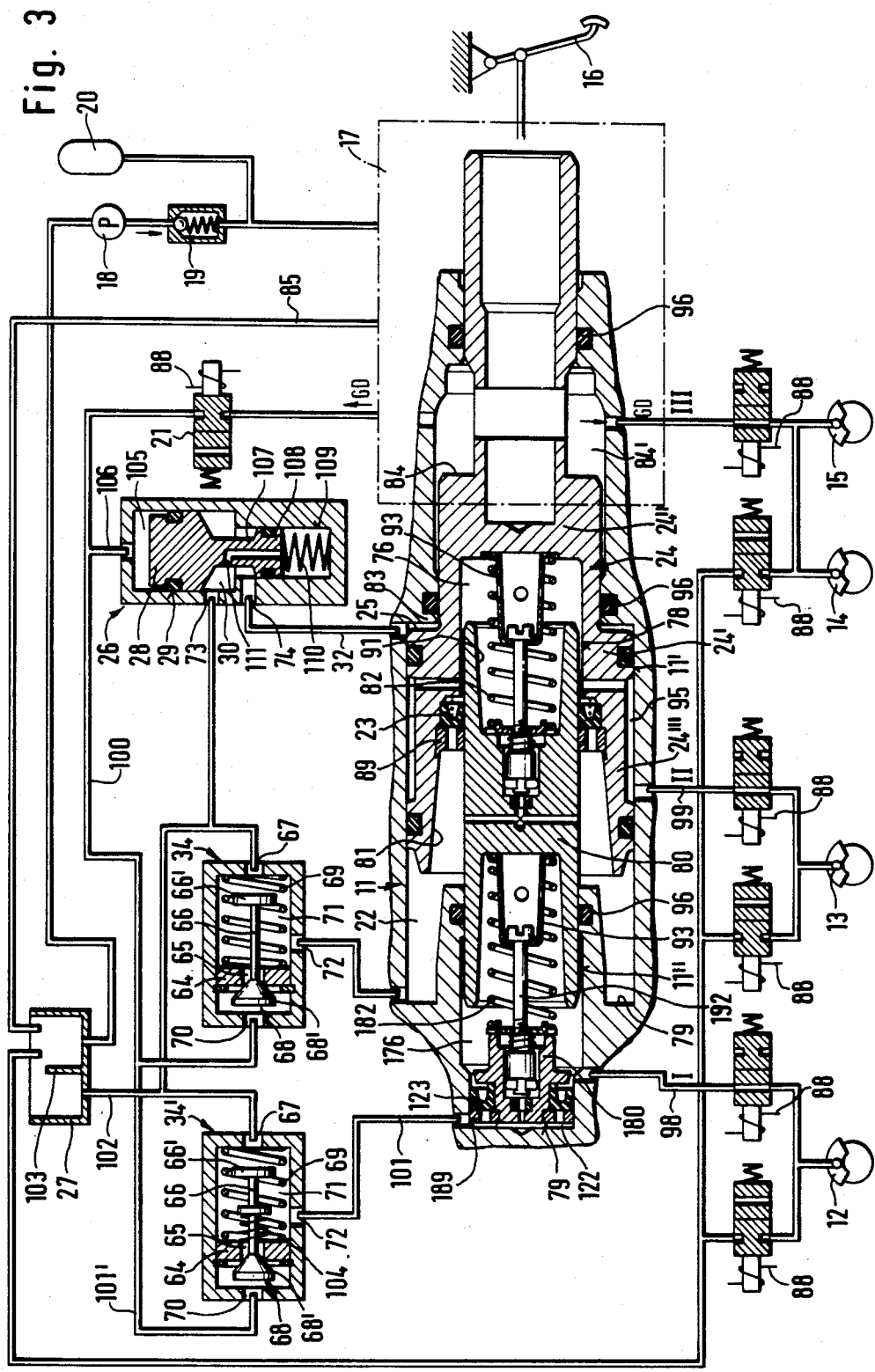
FIG. 3 is an identical-type view of a further embodiment of a hydraulic servo vehicle brake according to the invention, with a tandem master cylinder.

In the embodiment according to FIG. 3, in addition to the embodiment as per FIG. 2, a tandem master cylinder 11 with an additional secondary cylinder 11'' is provided instead of a simplex-type master cylinder. For that purpose, the second master piston 80 is not only axially slidable within the first master piston 24, but extends, with its rear end range, into the secondary cylinder 11'' which is configured at the master cylinder bottom 79 and which, on its part, projects an additional length from the master cylinder bottom 79 into the annular chamber 22 in the shape of a sleeve and is linked, through a hydraulic line 98, with the brake circuit I, that is to say, with the closing valve SO of the one front wheel cylinder 12. The annular chamber 95 provided at the master piston 24 as in the embodiment according to FIG. 2, is linked, through the hydraulic line 99, only with the closing valve SO of the other wheel cylinder 13 of the front axle which belongs to the brake circuit II.

The change-over valve 34 is linked to the annular chamber 22 in the way described with reference to FIG. 2. A further line 101' leads, moreover, from the hydraulic line 100, by way of a further change-over valve 34' having a configuration entirely analogous to that of the change-over valve 34 and being connected similarly to what is shown in FIG. 1, to an annular chamber 122 at the rear portion of the bottom 79 of the master cylinder 11 which is linked, through an apertured ring 189 and a non-return valve 123 configured in the shape of a sealing cup, to the pressure chamber 176 subjected to the pressure exerted by the second master piston 80. In analogy to the return spring 82 and to the stop device 92, 93 of the first master piston 24, a return spring 182 and another stop device 192, 193 are provided also between the second master piston 80 and the cylindrical supporting element 180 which is fastened to the master cylinder bottom 79 and at which the apertured ring 189 and the non-return valve 123 are configured.

The method of supply of make-up pressure medium for the brake circuit I, to which belongs the wheel cylinder 12, in the event of an incipient wheel slip is analogous to the supply to make-up pressure medium for the wheel cylinder 13 which has been described with reference to FIG. 2, namely in that upon opening of the switching valve 21, the controlled pressure GD is conveyed, through the hydraulic lines 100 and 101', the change-over valve 34', the hydraulic line 101, the annular chamber 122, the apertured ring 189 and the non-return valve 123 configurated as a sealing cup, into the pressure chamber 176 and from there forth to the wheel cylinder 12, where the consumed volume of pressure medium is immediately made up by the pump 18.

As in the embodiment according to FIG. 2, the pedal-retaining valve 26 is associated exclusively with the first master piston 24 because only this one is linked to the pedal 16 and because, at least in the event of a slip control action, substantially identical pressures will always exist at both front faces of the second master piston 80 which has a constant diameter.

Figure 4:
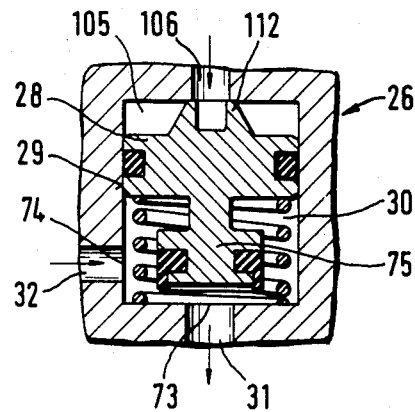
FIG. 4 is an axial cross-section of another embodiment of the pedal-retaining valve 26 as per FIGS. 1 to 3; and, FIG. 5 is a side view, partly in axial cross-section, of a particularly preferred embodiment of the change-over valve 34 as per FIGS. 2 and 3.

FIG. 4 shows another embodiment of the pedal-retaining valve 26. In the range of the ending of the hydraulic line 106, the piston slide element 28 is formed with an annular collar 112 which sealingly surrounds the inlet port and takes care that the piston slide element 28 starts abruptly to move downward only at an increased controlled pressure.

While the connection 74 is still arranged at the side of the cylinder 29 as it was, the connection 73 leading to the fluid reservoir 27 is positioned in the center of the bottom of the cylinder 29. Locking of the link between the connections 73, 74 is made by a closing disc 75 which is located in an axially offset position at the downward end of the piston slide element 28 and which, on a slide of the piston slide element 28, comes to rest on the opening forming the connection 73, so locking it tightly.

Figure 5:
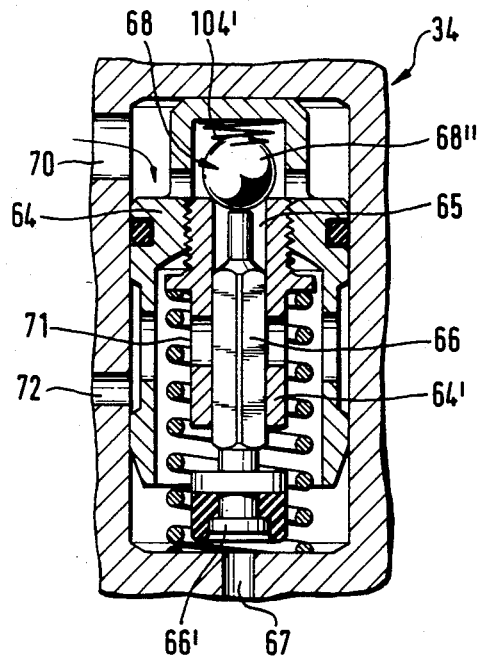

According to FIG. 5, the valve 68 within the change-over valve 34 is formed by a ball 68" which is forced against the edge of the opening 65 by a spring 104'. The closing push rod 66 is axially slidably accommodated in a prolongation 64' of the piston 64 and presses, with its closing disc 66', against the outlet port 67 when the piston 64 is forced forward in downward direction. As soon as the closing disc 66' has come to rest on the outlet port 67, the closing push rod 66 will move upward relative to the piston 64 and thus will open the valve 68 when the piston 64 continues to slide forward.

What is claimed is:

1. A hydraulic servo vehicle brake with a master cylinder which contains at least one pedal-actuated master piston and at least one first brake circuit with wheel cylinders linked to a pressure chamber subjected to the pressure exerted by the master piston with a brake application valve being arranged between the brake pedal and the master piston and, on actuation by the brake pedal, applying pressure medium supplied by a hydraulic pump connected with a fluid reservoir in a controlled manner to the master piston and directly to a further brake circuit to furnish a controlled pressure, and with a wheel slip-brake control unit which, in the event of incipient slip of one single or several vehicle wheels, automatically reduces the brake power at the relevant vehicle wheel or relevant vehicle wheels to a value just enabling the wheels to rotate and comprises a switching valve which is also subjected to the controlled pressure and is normally closed and opens at incipient slip of one or several vehicle wheels in order to apply the controlled pressure, through a non-return valve, directly to the pressure chamber on which the master piston acts, a hydraulic pedal-retaining arrangement subjected to the controlled pressure which penetrates through the opened switching valve preventing any major change of the position the pedal has assumed at the moment of opening of the switching valve, wherein the outlet (136) of the switching valve (21) is linked to the said pressure chamber (76, 176) subjected to the pressure exerted by the master piston (24, 80) through a change-over valve (34, 34') and a non-return valve (23, 123) which opens when the pressure supplied from said outlet (136) of said switching valve (21) is higher than the pressure in said pressure chamber (76) and which is closed in any other condition, wherein said master piston (24) succeeding the said brake application valve (17) and the master cylinder (11) are provided with a stepped extension (24' and 11', respectively) in the direction of said pressure chamber (76) subjected to the pressure applied by the said master piston (24), and wherein a pedal-retaining annular chamber (25) is normally connected with the fluid reservoir (27) through a pedal-retaining valve (26) controlled by the switching valve (21) and is sealed off from the atmosphere in the event of a wheel slip, said change-over valve (34, 34') linking the said non-return valve (23, 123) either to the controlled pressure (GD) when the said switching valve (21) is open or to said fluid reservoir (27) in all other conditions wherein said pedal-retaining valve (26) is provided with a piston slide element (28) subjected to the pressure conveyed by said switching valve (21) and accommodated in a cylinder (29) into whose cylinder chamber (30) facing away from the pressure side (105) hydraulic lines (31 and 32) leading to said fluid reservoir (27) and to said pedal-retaining annular chamber (25), respectively end up through connections (73 and 74) which normally are interconnected through said cylinder chamber (30), but are separated hydraulically when the said piston slide element (28) is shifted because said switching valve (21) has opened wherein a closing member (75) arranged at the said piston slide element (28) on the side of the said cylinder chamber (30) closes said connection (73) positioned opposite said piston slide element (28) on a slide of thereof, and wherein said master piston (24) is provided, on the side facing its pressure chamber (76), with a cylindrical axial bore (78) into which a fitting, stationary second master piston (80) originating from the master cylinder bottom (79) tightly extends, said non-return valve (23) being arranged in the shape of a sealing cup being provided between said second master piston (80) and the annular portion (24''') of said piston (24), said annular portion (24''') of said piston (24), said annular portion (24''') of said piston (24), said annular portion (24''') being defined by the said axial bore (78) and which further includes the said stepped extension (24'), wherein said switching valve (21) is linked to the annular chamber (22) existing around that portion of the said second master cylinder (80) which projects from said axial bore (78) of said master piston (24), said linkage being realized by way of said change-over valve (34) which normally links said annular chamber (22) with said fluid reservoir (27), but which connects the said annular chamber (22) with said switching valve (21) in the event of a wheel slip.

2. A hydraulic servo vehicle brake with a master cylinder which contains at least one pedal-actuated master piston and at least one first brake circuit with wheel cylinders linked to a pressure chamber subjected to the pressure exerted by the master piston with a brake application valve being arranged between the brake pedal and the master piston and, on actuation by the brake pedal, applying pressure medium supplied by a hydraulic pump connected with a fluid reservoir in a controlled manner to the master piston and directly to a further brake circuit to furnish a controlled pressure, and with a wheel slip-brake control unit which, in the event of incipient slip of one single or several vehicle wheels, automatically reduces the brake power at the relevant vehicle wheel or relevant vehicle wheels to a value just enabling the wheels to rotate and comprises a switching valve which is also subjected to the controlled pressure and is normally closed and opens at incipient slip of one or several vehicle wheels in order to apply the controlled pressure, through a non-return valve, directly to the pressure chamber on which the master piston acts, a hydraulic pedal-retaining arrangement subjected to the controlled pressure which penetrates through the opened switching valve preventing any major change of the position the pedal has assumed at the moment of opening of the switching valve, wherein the outlet (136) of the switching valve (21) is linked to the said pressure chamber (76, 176) subjected to the pressure exerted by the master piston (24, 80) through a change-over valve (34, 34') and a non-return valve (23, 123) which opens when the pressure supplied from said outlet (136) of said switching valve (21) is higher than the pressure in said pressure chamber (76) and which is closed in any other condition, wherein said master piston (24) succeeding the said brake application valve (17) and the master cylinder (11) are provided with a stepped extension (24' and 11', respectively) in the direction of said pressure chamber (76) subjected to the pressure applied by the said master piston (24), and wherein a pedal-retaining annular chamber (25) is normally connected with the fluid reservoir (27) through a pedal-retaining valve (26) controlled by the switching valve (21) and is sealed off from the atmosphere in the event of a wheel slip, said change-over valve (34, 34') linking the said non-return valve (23, 123) either to the controlled pressure (GD) when the said switching valve (21) is open or to said fluid reservoir (27) in all other conditions and wherein said master piston (24) is furnished on the side facing its said pressure chamber (76) with a said cylindrical axial bore (78) into which said second master piston (80) originating from the said master cylinder bottom (79) is tightly fitted and extends and which is axially slidable within a portion (11") of said master cylinder (11), said non-return valve (23) being arranged in the shape of a sealing cup being provided between said second master piston (80) and said annular portion (24''') of said piston (24), which annular portion (24''') is defined by said axial bore (78) and which further includes said stepped extension (24'), and wherein said switching valve (21) is linked to said annular chamber (22) existing around that portion of the said second master piston (80) which projects from the said axial bore (78) of the said master piston (24), said linkage being realized by way of said change-over valve (34) which normally links said annular chamber (22) with the said fluid reservoir (27), but connects said annular chamber (22) with the said switching valve (21) instead in the event of a wheel slip, and wherein said change-over valve (34) is further linked, through a further said non-return valve (123), to said pressure chamber (176) which is subjected to the pressure applied by said second master piston (80) and from which a second brake circuit (II) branches off.

3. A vehicle brake as claimed in claim 2, wherein said annular portion (24''') of said first master piston (24) is radially externally furnished with an annular chamber (95) to which said first brake circuit (I) is linked and which is connected, through bores (94), with said pressure chamber (76).

4. A vehicle brake as claimed in claim 3, wherein said change-over valve (34) is provided with a piston (64) which is furnished with an opening (65) and is subjected to the force of a return spring (69) contrasting the pressure applied to said piston (64) and in which a closing push rod (66) with a closing plate (66') is arranged, which latter is opposed by an outlet port (67) and closes said outlet port (67) when in abutment therewith, said closing push rod (66) interacting, with its other end, with a valve (68) closing said opening (65) in said piston (64), the interaction being that upon the closure of the said outlet port (67), said closing push rod (66) opens said valve (68) when said piston (64) moves further, with the inlet port (70) being linked to said switching valve (21), said outlet port (67) to the said fluid reservoir (27) and the chamber (71) between said piston (64) and said outlet port (67), through a connecting port (72), and to said annular chamber (22).

5. A vehicle brake as claimed in claim 4, wherein said non-return valve (23, 123) is arranged in a cylindrical supporting element (180) which is arranged at said bottom (79) of said master cylinder (11) and which bears an apertured ring (189) on the side linked to said switching valve and said non-return valve (123) arranged as a sealing cup on the opposite side.

6. A vehicle brake as claimed in claim 5, wherein a return spring (82) extends between each master piston (24, 80) and said bottom (79) of said master cylinder (11).

7. A vehicle brake as claimed in claim 6, wherein between each said master piston (24, 80) and said bottom (79) of the said master cylinder (11), said supporting element (180), said master piston (80), a stop device (92, 93) extends which limits the return movement of the respective master piston (24, 80).

* * * * *